F. A. HEMMINGSON.
ANIMAL TRAP.
APPLICATION FILED AUG. 21, 1914.
1,183,817.
Patented May 16, 1916.
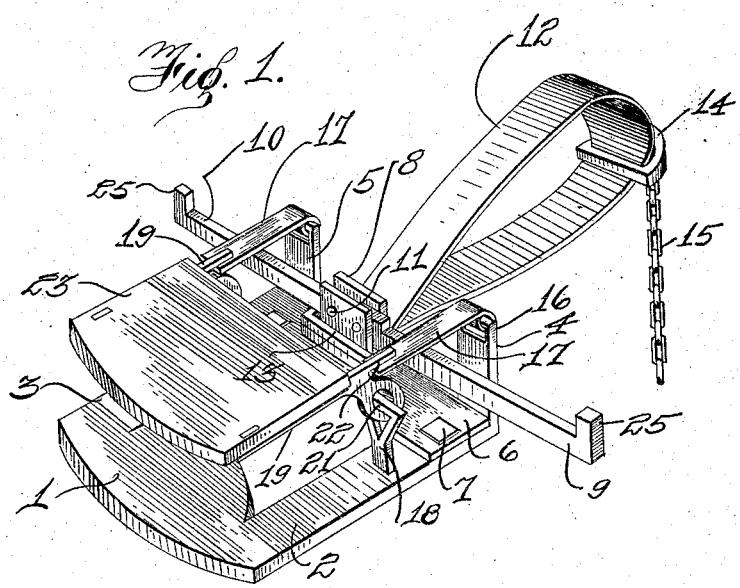
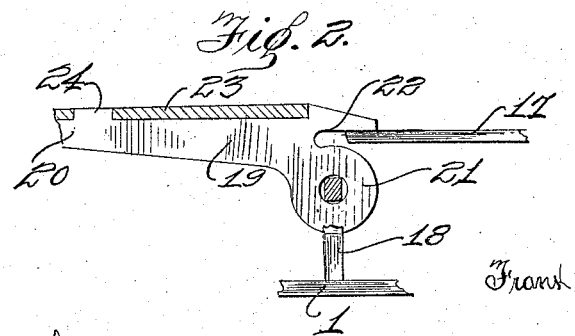

UNITED STATES PATENT OFFICE.

FRANK A. HEMMINGSON, OF OGDENSBURG, WISCONSIN.

ANIMAL-TRAP.

1,183,817. Specification of Letters Patent. Patented May 16, 1916.

Application filed August 21, 1914. Serial No. 857,898.

*To all whom it may concern:*

Be it known that I, FRANK A. HEMMINGSON, a citizen of the United States, residing at Ogdensburg, in the county of Waupaca and State of Wisconsin, have invented certain new and useful Improvements in Animal-Traps, of which the following is a specification.

An object of my invention is to provide an animal trap of the spring-jaw type having the parts thereof so constructed and arranged that the trap may be set in a path traversed by animals and may be covered with dirt, leaves, or other debris to form a blind, or which may be set with bait placed at proper points to lead the animal thereonto and which when sprung by the weight of the animal on the tread plate closes with a strong action about the neck or body of the animal and either kills the animal or exerts a holding action thereon in such a way to prevent all possibility of escape.

A further object is to construct the several parts of the trap in such a manner that each may be stamped from sheet metal and the several members may be assembled without the use of rivets and without other complicated operations which tend to materially increase the cost of original production of such a device.

With other objects in view, which will be referred to, my invention consists in the peculiar combination and novel arrangement of parts, such as will be hereinafter more fully described in connection with the accompanying drawings and more particularly pointed out in the appended claim.

In the drawings:—Figure 1 is a view in perspective of the trap with the parts thereof set to be operated by pressure exerted on the tread plate. Fig. 2 is a fragmentary view in side elevation of certain of the operating parts of the mechanism.

The several members of the structure of the trap are stamped and bent from sheet metal and in this way a structure is formed which is readily and cheaply manufactured and which at the same time is light in weight and efficient in operation, presenting very little likelihood of a disarrangement of the parts or a breakage in use. The base member 1 is stamped to have a cross-head from which the arms 2 and 3 extend and these arms are bent upwardly at their outer ends at right angles to the main extent thereof to form the standards 4 and 5. A yoke member 6 is connected across the arms 2 and 3 adjacent the upturned brackets 4 and 5 and is secured thereto by passing the tongues 7 bent from the base member 1 up through orifices provided in the yoke member 6 and then clenching these tongues down against the top of the yoke member. A bearing member 8, bifurcated in its longitudinal extent, is secured at the center of this yoke member 6 and the jaws 9 and 10 are pivotally mounted at their one end in the bifurcated portion by the pin 11 so that these jaws will swing to position over the arms 2 and 3 and adjacent the upright standards or supports 4 and 5.

The bow-leaf spring 12 has the end thereof widened out and the slots 13 are provided through the enlarged end to permit the reception of these ends over the bearing member 8, the lower end of the bow-leaf spring 12 being secured to the yoke member 6 and the upper end having the opening therethrough made of a sufficient size that the spring works loose over the bearing and over the jaw members 9 and 10. As a means of holding the trap secured in the proper position, and to prevent an animal caught in such a way as to not be killed from dragging the trap, the ring 14 is passed through the loop of the spring member 12 and the chain 15 is attached thereto, it being understood of course that a swivel can be provided between the chain and the ring and any suitable means, as for instance the usual spike or cross-rod, can be attached to the free end of the chain to form a means by which the chain may be secured.

The standards 4 and 5 at their upper ends are slotted as at 16 and retaining members 17 are bent at their ends to pass through these slots 16 and are wound up to form a closed eyelet to prevent displacement of the retaining members therefrom, the retaining members being of such a length and so positioned that when the jaw members 9 and 10 are opened to extend in a horizontal position, these retaining members will lie on the gripping edges of the jaws and when the retaining members are held in the position against the gripping edges, the gripping jaws will be maintained in their open position against the closing tension exerted by the upper end of the leaf spring 12.

The bracket members 18 are connected on the arms 2 and 3 at a point beyond the mounting of the yoke 6 thereon and these bracket members may be stamped and bent from sheet metal, the cross bearing thereof being divided at its center to permit the setting and mounting of the trigger members 19 thereon. These trigger members comprise the arm 20 which has a bearing 21 provided on the one end thereof and a notch 22 is formed in the trigger member above the disposition of the bearing. The tread plate 23 is connected across the two trigger members 19 and by the structure thus provided the trigger members are held to move together and when the tread plate 23 is raised to lie in a horizontal plane, with the retaining members 17 brought down against the horizontally disposed gripping jaws 9 and 10, these retaining members 17 will be received at their free ends in the notches 22 and then when the pressure upon the upper extent of the leaf spring 12 by which this leaf spring is flexed to a position to permit the opening of the jaw members 9 and 10 is released, the leaf spring will exert a pressure in a closing direction against the jaw members 9 and 10 and by reason of the pressure exerted against the retaining members 17, these retaining members will be held within the notches 22 and the tread plate 23 will be maintained in the horizontal position. In the illustration of the structure of the trigger members 19, these members on their upper edge are cut away to receive the tread plate 23 and tongues 24 are provided to extend therefrom and to be received through openings provided in the tread plate after which the ends of these tongues 24 are clenched down to form a solid structure and to maintain the parts in the proper relation.

When the trap is set, the parts will occupy the relative position illustrated in Fig. 1 and the retaining members 17 will be held within the notches 22 in the relation illustrated in Fig. 2, but immediately pressure is exerted upon the tread plate 23 by an animal stepping thereonto, this tread plate will be depressed and the overhanging portion of the trigger members 19 above the slots 22 will pass from its position of engagement with the retaining members 17. As a pressure is exerted upon the gripping jaws 9 and 10 by the spring 12, the retaining members 17 will be displaced from the path of the jaws 9 and 10 and these jaws will swing up to a position to engage around the neck or body of the animal and the animal will be either killed by the impact blow exerted by the sharp closing of the jaws accomplished through the spring tension of the member 12 or will be held gripped between these jaws and will be prevented from escape. While in the present instance, the jaws 9 and 10 are illustrated with the gripping edges thereof made smooth and plain and these inturned edges 25 are in a like manner shaped to present a blunt structure, it will be obvious that teeth may be provided along the extent of the gripping edges and in some instances penetrating spikes will prove desirable, the structure of the gripping jaws and the nature of formation of the gripping edges thereof being governed entirely by the requirements of usage and whether the trap is intended to be used in the capture of animals whose pelts are to be kept in a perfect condition for fur pelts or whether the trap is intended merely to destroy the animal.

From the foregoing it will be seen that I have provided an animal trap which comprises few parts, simple in manufacture and assembly and which are so constructed that the trap is quick in action and efficient in operation and further that the trap may be used by setting in the bed of a stream as well as upon land and the parts will operate with the same facility.

While I have herein shown and described one specific form of my invention, it will be understood that slight changes might be made in the form and arrangement of the several parts of the structure without departing from the spirit and scope of my invention, and hence I do not wish to be limited thereto except for such limitations as the claim may import.

I claim:—

An animal trap comprising a base member having arms extending therefrom bent upwardly at their free ends to form standards, a yoke secured across said arms adjacent said standards, a bearing member bifurcated in its longitudinal extent carried by said yoke between said standards, gripping jaws pivoted at their one end between the braces of the bifurcated portion of said bearing to open on either side of said standards and to lie in a horizontally alined position, a leaf spring member provided with collars at its ends and bowed to position said collars over said bearing members to exert a closing pressure against said gripping jaws, said standards slotted adjacent their upper end, retaining members having sleeves formed at their one end to engage the slotted portion of said standards and position said retaining members in pivotal relation thereto, brackets carried by said arms, trigger members rockably mounted on said brackets and provided with lips to engage the free ends of said retaining members when said jaws are in an open position, and a tread plate connecting said trigger members whereby pressure thereon will cause the disengagement of said lips and said retaining members which in turn allow said jaws to move into a closed position under tension of said spring.

In testimony whereof I affix my signature in presence of two witnesses.

FRANK A. HEMMINGSON.

Witnesses:
PHILIP L. HABERSAAT,
GEO. HEMMINGSON.